United States Patent
Nakazawa et al.

(10) Patent No.: US 11,731,992 B2
(45) Date of Patent: Aug. 22, 2023

(54) METHOD FOR PREPARING HALOSILANE COMPOUNDS

(71) Applicant: SHIN-ETSU CHEMICAL CO., LTD., Tokyo (JP)

(72) Inventors: Koichi Nakazawa, Joetsu (JP); Takahiro Kojima, Joetsu (JP); Ayumu Kiyomori, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 17/711,376

(22) Filed: Apr. 1, 2022

(65) Prior Publication Data

US 2022/0356195 A1    Nov. 10, 2022

(30) Foreign Application Priority Data

Apr. 28, 2021 (JP) ................. 2021-075964

(51) Int. Cl.
  *C07F 7/14*    (2006.01)
  *B01J 31/12*   (2006.01)

(52) U.S. Cl.
  CPC ............. *C07F 7/14* (2013.01); *B01J 31/122* (2013.01); *B01J 2231/323* (2013.01); *B01J 2531/827* (2013.01)

(58) Field of Classification Search
  CPC ............ C07F 7/14; C07F 17/02; B01J 23/468
  See application file for complete search history.

(56) References Cited

U.S. PATENT DOCUMENTS

| | | | |
|---|---|---|---|
| 6,359,161 B2 | 3/2002 | Tonomura et al. | |
| 2001/0053861 A1* | 12/2001 | Tonomura | C07F 7/14 556/478 |

FOREIGN PATENT DOCUMENTS

| | | |
|---|---|---|
| EP | 1 156 052 A3 | 11/2001 |
| JP | 11-29584 A | 2/1999 |
| JP | 2000-256372 A | 9/2000 |
| JP | 2001-322993 A | 11/2001 |
| JP | 2003-96086 A | 4/2003 |
| JP | 2010-6727 A | 1/2010 |

* cited by examiner

*Primary Examiner* — Pancham Bakshi
(74) *Attorney, Agent, or Firm* — Birch, Stewart, Kolasch & Birch, LLP

(57) ABSTRACT

A halosilane compound: $R^1CH_2CH_2SiR^5{}_2X$ is prepared by hydrosilylation reaction of a vinyl compound: $R^1CH=CH_2$ with a halogenodiorganosilane compound having formula: $HSiR^5{}_2X$ in the co-presence of an iridium catalyst, an internal olefin compound, and an allyl halide. The halosilane compound is prepared on an industrial scale with the advantages of low costs, high yields, and high selectivity, using a small amount of iridium catalyst.

11 Claims, No Drawings

METHOD FOR PREPARING HALOSILANE COMPOUNDS

CROSS-REFERENCE TO RELATED APPLICATION

This non-provisional application claims priority under 35 U.S.C. § 119(a) on Patent Application No. 2021-075964 filed in Japan on Apr. 28, 2021, the entire contents of which are hereby incorporated by reference.

TECHNICAL FIELD

This invention relates to a method for preparing halosilane compounds.

BACKGROUND ART

Silicon-containing compounds are used in various applications as silane compounds, silicone rubbers, silicone resins, and many other products. Among these, silane compounds are utilized as silane coupling agents and surface treating agents. It is useful to establish a method for efficiently preparing silane compounds.

One known method for preparing silane compounds is addition reaction (or hydrosilylation reaction) of unsaturated bond-containing compounds with hydrosilane compounds in the presence of metal catalysts such as platinum, rhodium and iridium catalysts. The hydrosilylation reaction is widely utilized in the industry because of least wastes formed in the course of reaction and superior atom economy.

In the hydrosilylation reaction, however, often the desired silane compound is not obtained alone because isomerization by-products are formed as a result of isomerization of unsaturated bonds in reactants and addition-isomer by-products are formed as a result of addition of hydrosilane compounds at different positions. It is desired to reduce these by-products.

As hydrosilane compound, for example, chlorosilane and alkoxysilane compounds are used. Of the chlorosilane compounds, many reports describe the use of trichlorosilane and methyldichlorosilane. On the other hand, few reports describe the use of dialkylchlorosilanes such as dimethylchlorosilane because of low reaction selectivity and more by-products. Such reaction using platinum catalysts is known from Patent Documents 1 and 2, rhodium catalysts from Patent Document 3, and iridium catalysts from Patent Documents 4 and 5.

CITATION LIST

Patent Document 1: JP-A H11-029584
Patent Document 2: JP-A 2000-256372
Patent Document 3: JP-A 2010-006727
Patent Document 4: JP-A 2001-322993 (U.S. Pat. No. 6,359,161, EP 1156052)
Patent Document 5: JP-A 2003-096086

DISCLOSURE OF INVENTION

On use of platinum catalysts as described in Patent Documents 1 and 2, the desired silane compound is obtained merely in a yield of about 70 to 80%, even when co-catalysts are added, because of isomerization of unsaturated bonds and formation of addition isomers.

On use of rhodium catalysts as described in Patent Document 3, a vinyl compound must be added dropwise to dimethylchlorosilane. In the reaction system, disproportionation of dimethylchlorosilane can take place to give off hydrogen and highly volatile dimethylchlorosilane will scatter. The dropwise addition of dimethylchlorosilane to a vinyl compound is thus desirable in the industrial production.

On use of iridium catalysts as described in Patent Documents 4 and 5, the desired silane compound is selectively synthesized because formation of by-products such as addition isomers is restrained as compared with platinum catalysts. This method, however, must use highly reactive reactants such as halogenated allyl compounds (Patent Document 4) or carboxylic acid allyl esters (Patent Document 5), that is, the range of applicable reactants is limited. In the case of low reactive reactants, greater amounts of expensive iridium catalysts must be used. The method is thus not regarded adequate for the industrial scale of manufacture.

An object of the invention is to provide a method for preparing halosilane compounds on an industrial scale with advantages including low costs, high yields, and high selectivity, through hydrosilylation reaction of halogenodiorganosilane compounds such as dimethylchlorosilane while reducing the amount of expensive iridium catalysts used.

The inventors have found that in a method for preparing a halosilane compound through hydrosilylation reaction of a vinyl compound with a halogenodiorganosilane compound in the presence of an iridium catalyst, quite unexpectedly, the deactivation of the iridium catalyst in the course of reaction is retarded by adding an internal olefin compound and a halogenated allyl compound to the reaction system. The halosilane compound can be prepared at low costs, in high yields, and with a high selectivity while reducing the amount of the iridium catalyst used.

In one aspect, the invention provides a method for preparing a halosilane compound comprising the step of effecting hydrosilylation reaction of a vinyl compound having the general formula (1):

$$R^1CH=CH_2 \qquad (1)$$

wherein $R^1$ is a $C_1$-$C_{20}$ substituted or unsubstituted monovalent hydrocarbon group which may contain oxygen or silicon, or a silyl group having the general formula (2):

$$-SiR^2R^3R^4 \qquad (2)$$

wherein $R^2$ to $R^4$ are each independently halogen, a $C_1$-$C_{10}$ unsubstituted monovalent hydrocarbon group or a $C_1$-$C_{10}$ unsubstituted alkoxy group, with a halogenodiorganosilane compound having the general formula (3):

$$HSiR^5_2X \qquad (3)$$

wherein $R^5$ is each independently a $C_1$-$C_{20}$ unsubstituted monovalent hydrocarbon group and X is halogen, in the presence of an iridium catalyst to produce a halosilane compound having the general formula (4):

$$R^1CH_2CH_2SiR^5_2X \qquad (4)$$

wherein $R^1$, $R^5$, and X are as defined above. The hydrosilylation reaction is effected in the co-presence of an internal olefin compound having the general formula (5):

(5)

wherein $R^6$ and $R^7$ are each independently a $C_1$-$C_{10}$ unsubstituted monovalent hydrocarbon group, $R^5$ and $R^7$ may bond together to form a ring with the carbon atoms to which they are attached, $R^8$ and $R^9$ are each independently hydrogen or a $C_1$-$C_{10}$ unsubstituted monovalent hydrocarbon group and a halogenated allyl compound having the general formula (6):

$$YCH_2CH=CH_2 \quad (6)$$

wherein Y is halogen, exclusive of the vinyl compound having formula (1).

Typically, the halogenated allyl compound is allyl chloride or allyl bromide.

In the reaction system, the halogenated allyl compound is preferably present in an amount of 0.00001 to 1 mole per mole of the vinyl compound.

In a preferred embodiment, the iridium catalyst is an iridium complex having the general formula (7):

$$[Ir(R)Z]_2 \quad (7)$$

wherein R is a cyclic diene compound having the general formula (8):

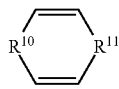

(8)

wherein $R^{10}$ and $R^{11}$ are each independently a $C_1$-$C_5$ divalent hydrocarbon group, $R^{10}$ and $R^{11}$ may bond together to form a ring with the carbon atoms to which they are attached, and Z is halogen.

Typically, the internal olefin compound is a cyclic olefin compound.

Advantageous Effects of Invention

The inventive method is successful in preparing halosilane compounds at low costs, in high yields, and with a high selectivity, using a small amount of an iridium catalyst.

DESCRIPTION OF PREFERRED EMBODIMENTS

One of the reactants used herein is a vinyl compound having the general formula (1).

$$R^1CH=CH_2 \quad (1)$$

Herein $R^1$ is a $C_1$-$C_{20}$, preferably $C_1$-$C_{10}$ substituted or unsubstituted monovalent hydrocarbon group which may contain oxygen or silicon, or a silyl group having the general formula (2):

$$—SiR^2R^3R^4 \quad (2)$$

wherein $R^2$ to $R^4$ are each independently halogen, a $C_1$-$C_{10}$, preferably $C_1$-$C_5$ unsubstituted monovalent hydrocarbon group, or a $C_1$-$C_{10}$, preferably $C_1$-$C_5$, more preferably $C_1$-$C_3$ unsubstituted alkoxy group.

Suitable monovalent hydrocarbon groups $R^1$ include straight, branched or cyclic alkyl groups, alkenyl groups, aryl groups, and aralkyl groups. Illustrative examples include straight alkyl groups such as methyl, ethyl, n-propyl, n-butyl, pentyl, hexyl, heptyl, octyl, decyl, dodecyl, tetradecyl and octadecyl; branched alkyl groups such as isopropyl, isobutyl, sec-butyl, and tert-butyl; cyclic alkyl groups such as cyclopentyl and cyclohexyl; alkenyl groups such as 2-propenyl (or allyl), 2-butenyl, and 3-butenyl; aryl groups such as phenyl, tolyl and naphthyl; and aralkyl groups such as phenylmethyl, 2-phenylethyl, 4-methoxyphenylmethyl and naphthylmethyl. Of these, straight alkyl groups and aralkyl groups are preferred because less by-products are formed and the desired halosilane compound is fully selectively prepared.

Suitable monovalent hydrocarbon groups containing oxygen or silicon include 2-oxapropyl, 2-silapropyl, 2-oxabutyl, 2-silabutyl, 3-oxabutyl, and 3-silabutyl.

In the hydrocarbon groups, some or all of the hydrogen atoms may be substituted by substituents. Exemplary substituents include C1-C5 alkoxy groups such as methoxy, ethoxy and (iso)propoxy, halogen atoms such as fluorine, chlorine, bromine and iodine, acyl groups, and carbonyl groups having an ester bond.

Suitable monovalent hydrocarbon groups represented by $R^2$ to $R^4$ include straight, branched or cyclic alkyl groups, alkenyl groups, and aryl groups. Illustrative examples include straight alkyl groups such as methyl, ethyl, n-propyl, n-butyl, pentyl, hexyl, heptyl, octyl, and decyl; branched alkyl groups such as isopropyl, isobutyl, sec-butyl, and tert-butyl; cyclic alkyl groups such as cyclopentyl and cyclohexyl; alkenyl groups such as vinyl, 1-propenyl, and 2-propenyl (or allyl); and aryl groups such as phenyl, tolyl and naphthyl.

In the alkoxy groups represented by $R^2$ to $R^4$, the alkyl moiety may be straight, branched or cyclic. Exemplary alkoxy groups include straight alkoxy groups such as methoxy, ethoxy, n-propoxy, n-butoxy, pentyloxy, hexyloxy, heptyloxy, octyloxy, and decyloxy; branched alkoxy groups such as isopropoxy, isobutoxy, sec-butoxy, and tert-butoxy; and cyclic alkoxy groups such as cyclopentyloxy and cyclohexyloxy.

Examples of the halogen represented by $R^2$ to $R^4$ include chlorine, bromine, iodine, and fluorine.

Examples of the silyl group having formula (2) include halosilyl groups such as trichlorosilyl, methyldichlorosilyl, dimethylchlorosilyl, tribromosilyl, methyldibromosilyl, dimethylbromosilyl, triiodosilyl, methyldiiodosilyl, dimethyliodosilyl, trifluorosilyl, methyldifluorosilyl, dimethylfluorosilyl, ethyldichlorosilyl, diethylchlorosilyl, propyldichlorosilyl, and dipropylchlorosilyl; alkylsilyl groups such as trimethylsilyl, triethylsilvl, tripropylsilyl, and triisopropylsilyl; and alkoxysilyl groups such as trimethoxysilyl, methyldimethoxysilyl, dimethylmethoxysilyl, triethoxysilyl, methyldiethoxysilyl, and dimethylethoxysilyl.

Examples of the vinyl compound having formula (1) include straight, branched or cyclic unsaturated hydrocarbon compounds such as 1-butene, 1-hexene, 1-octene, 1-decene, 1-octadecene, 3-methyl-1-butene, 3,3-dimethyl-1-butene, 4-methyl-1-pentene, vinylcyclopentane, vinylcyclohexane, butadiene, 1,3-pentadiene, and 1,4-pentadiene; aromatic ring-containing unsaturated compounds such as styrene, 3-phenyl-1-propene, 4-phenyl-1-butene, 4-allylanisole, and vinylnaphthalene; halogenated compounds such as allyl chloride, allyl bromide, 3-chloro-1-butene, 3-bromo-1-butene, 4-chloro-1-butene, 4-bromo-1-butene, 5-chloro-1-pentene, 6-chloro-1-hexene, 7-chloro-1-heptene, and 8-chloro-1-octene; carbonyl compounds such as allyl acetate, 1-butenyl acetate, allyl propionate, allyl acrylate, allyl methacrylate, allyl benzoate, methyl acrylate, methyl 3-butenoate, methyl 4-pentenoate, methyl vinyl ketone, ethyl vinyl ketone, methyl allyl ketone, and ethyl allyl ketone; ether compounds such as allyl methyl ether, 3-butenyl methyl ether, methyl 4-pentenyl ether, allyl ethyl ether, 3-butenyl ethyl ether, and ethyl 4-pentenyl ether; vinylsilane compounds such as trimethylvinylsilane, triethylvinylsilane, chlorodimethylvinylsilane, chlorodiethylvinylsilane, dichloromethylvinylsilane, and trichlorovinylsilane, and silane compounds such as trimethylallylsilane, chlorodimethylallylsilane, chlorodiethylallylsilane, dichloromethylallylsilane, and trichloroallylsilane.

The halogenodiorganosilane compound used herein has the general formula (3):

$$HSiR^5_2X \quad (3)$$

wherein $R^5$ is each independently a $C_1$-$C_{20}$, preferably $C_1$-$C_{10}$, more preferably $C_1$-$C_5$ unsubstituted monovalent hydrocarbon group and X is halogen.

Suitable monovalent hydrocarbon groups $R^5$ include straight, branched or cyclic alkyl groups, alkenyl groups, aryl groups, and aralkyl groups, examples of which are as exemplified for the monovalent hydrocarbon group $R^1$.

Examples of the halogen X include chlorine, bromine, iodine, and fluorine, with chlorine being preferred.

Examples of the halogenodiorganosilane having formula (3) include dimethylchlorosilane, diethylchlorosilane, dipropylchlorosilane, diisopropylchlorosilane, dimethylbromosilane, diethylbromosilane, dipropylbromosilane, diisopropylbromosilane, dimethyliodosilane, diethyliodosilane, dipropyliodosilane, diisopropyliodosilane, dimethylfluorosilane, diethylfluorosilane, dipropylfluorosilane, and diisopropylfluorosilane. Of these, dialkylchlorosilane compounds such as dimethylchlorosilane, diethylchlorosilane, dipropylchlorosilane, and diisopropylchlorosilane are preferred, with dimethylchlorosilane being most preferred.

Although the amount of the halogenodiorganosilane used is not particularly limited, it is preferably 0.5 to 2.0 moles, more preferably 0.9 to 1.2 moles, even more preferably 0.98 to 1.02 moles per mole of the vinyl compound.

The iridium catalyst used herein is typically selected from iridium salts and iridium complexes. Suitable iridium salts include iridium trichloride, iridium tetrachloride, hexachloroiridic acid, sodium hexachloroiridate, and potassium hexachloroiridate.

Preferred iridium complexes have the general formula (7):

$$[Ir(R)Z]_2 \quad (7)$$

wherein R is a cyclic diene compound having the general formula (8) and Z is halogen.

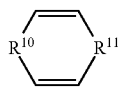
(8)

In formula (8), $R^{10}$ and $R^{11}$ are each independently a $C_1$-$C_5$, preferably $C_1$-$C_3$ divalent hydrocarbon group, $R^{10}$ and $R^{11}$ may bond together to form a ring with the carbon atoms to which they are attached. Examples of the divalent hydrocarbon groups $R^{10}$ and $R^{11}$ include methylene, methylmetylene, dimethylmethylene, ethylene, propylene, trimethylene, tetramethylene, and pentamethylene.

Examples of the halogen Z include chlorine, bromine, and iodine. From the aspect of stability of the iridium catalyst, chlorine is preferred.

Examples of the cyclic diene compound having formula (8) include 1,4-cyclohexadiene, 1,5-cyclooctadiene, and 2,5-norbornadiene.

Examples of the iridium complex having formula (7) include chlorine-containing iridium complexes such as di-μ-chlorobis(μ-1,4-cyclohexadiene)diiridium, di-μ-chlorobis (μ-1,5-cyclooctadiene)diiridium, and di-μ-chlorobis(μ-2,5-norbomadiene)diiridium; bromine-containing iridium complexes such as di-μ-bromobis(μ-1,4-cyclohexadiene) diiridium, di-μ-bromobis(μ-1,5-cyclooctadiene)diiridium, and di-μ-bromobis(μ-2,5-norbornadiene)diiridium; and iodine-containing iridium complexes such as di-μ-iodobis (μ-1,4-cyclohexadiene)diiridium, di-μ-iodobis(μ-1,5-cyclooctadiene)diiridium, and di-μ-iodobis(μ-2,5-norbomadiene)diiridium. Inter alia, the chlorine-containing iridium complexes are preferred from the aspect of stability.

Although the amount of the iridium catalyst used is not particularly limited, it is preferably 0.000001 to 0.01 mole, more preferably 0.00001 to 0.001 mole per mole of the vinyl compound from the aspect of reaction promoting effect.

The method for preparing a halosilane compound according to the invention is characterized in that the hydrosilylation reaction is effected in the presence of an internal olefin compound having the general formula (5) and a halogenated allyl compound having the general formula (6). Although the halogenated allyl compound is highly reactive in the hydrosilylation reaction using an iridium catalyst, it remains in the reaction system until the final stage of reaction even when added in a small amount, maintains the catalyst active, and prevents stopping of reaction and formation of by-products.

(5)

$$YCH_2CH=CH_2 \quad (6)$$

In formula (5), $R^6$ and $R^7$ are each independently a $C_1$-$C_{10}$, preferably $C_1$-$C_5$, more preferably $C_1$-$C_3$ unsubstituted monovalent hydrocarbon group, $R^6$ and $R^7$ may bond together to form a ring with the carbon atoms to which they are attached. $R^8$ and $R^9$ are each independently hydrogen or a $C_1$-$C_{10}$, preferably $C_1$-$C_5$, more preferably $C_1$-$C_3$ unsubstituted monovalent hydrocarbon group. The monovalent hydrocarbon groups $R^6$ to $R^9$ include straight, branched or cyclic alkyl groups and alkenyl groups, examples of which are as exemplified above for the monovalent hydrocarbon groups $R^2$ to $R^4$.

In formula (6), Y is a halogen atom such as chlorine, bromine, iodine or fluorine. Inter alia, chlorine or bromine is preferred for the effect of stabilizing the iridium catalyst.

Examples of the internal olefin compound having formula (5) include straight internal olefin compounds such as 2-hexene, 3-hexene, 2-heptene, 2-octene, 4-octene, 2-decene, and 5-decene, cyclic internal olefin compounds such as cyclopentene, cyclohexene, cyclooctene, and 2-norbornene, and cyclic diene compounds such as 1,3-cyclohexadiene, 1,4-cyclohexadiene, 4-vinyl-1-cyclohexene, 1,5-cyclooctadiene, 2,5-norbomadiene, 5-vinyl-2-norbornene, and limonene. Inter alia, 1,5-cyclooctadiene is most preferred from the aspects of reactivity and catalyst stabilization.

Examples of the halogenated allyl compound having formula (6) include allyl chloride, allyl bromide, allyl iodide, and allyl fluoride. Inter alia, allyl chloride and allyl bromide are preferred. The halogenated allyl compound having formula (6) used herein is different from the vinyl compound having formula (1) used as the starting reactant.

Although the amount of the internal olefin compound having formula (5) added is not particularly limited, the amount is preferably 0.5 to 10,000 moles, more preferably 1 to 1,000 moles per mole of iridium atom in the iridium catalyst from the aspects of by-product formation, yield, and purity.

Also, the amount of the halogenated allyl compound having formula (6) present in the reaction system is not particularly limited. The amount of the halogenated allyl compound, independent of whether it is added to or generated in the system, is preferably 0.00001 to 1 mole, more preferably 0.001 to 0.1 mole per mole of the vinyl compound having formula (1) from the aspects of by-product formation, yield, and purity.

Although the hydrosilylation reaction takes place in a solventless system, a solvent may be used if desired. Suitable solvents include hydrocarbon solvents such as pentane, hexane, cyclohexane, heptane, octane, isooctane, benzene, toluene, xylene, mesitylene, and tetralin; ether solvents such as diethyl ether, tetrahydrofuran and dioxane; ester solvents such as ethyl acetate and butyl acetate; aprotic polar solvents such as acetonitrile; and chlorinated hydrocarbon solvents such as dichloromethane and chloroform. The solvents may be used alone or in admixture.

The temperature of hydrosilylation reaction, though not particularly limited, is preferably 0° C. to 200° C., more preferably 10 to 100° C. under atmospheric pressure or applied pressure.

In the inventive method, little side reactions such as isomerization of the vinyl compound take place while the majority of the vinyl compound charged reacts with the halogenodiorganosilane. As the amount of the halogenodiorganosilane used is close to 1 mole, the remaining amounts of the vinyl compound and the halogenodiorganosilane become less, leading to a reduction in purification cost and an increase in preparation yield.

Examples of the halosilane compound having formula (4) obtained from the hydrosilylation reaction include butyldimethylchlorosilane, butyldiethylchlorosilane, butyldipropylchlorosilane, butyldiisopropylchlorosilane, butyldimethylbromosilane, butyldiethylbromosilane, butyldipropylbromosilane, butyldiisopropylbromosilane, butvldimethyliodosilane, butyldiethyliodosilane, butyldipropyliodosilane, butyldiisopropyliodosilane, butyldimethylfluorosilane, butyldiethylfluorosilane, butyldipropylfluorosilane, butyldiisopropylfluorosilane, hexyldimethylchlorosilane, octyldimethylchlorosilane, decyldimethylchlorosilane, octadecyldimethylchlorosilane, 3-methylbutyldimethylchlorosilane, 3,3-dimethylbutyldimethylchlorosilane, 2-cyclopentylethyldimethylchlorosilane, 2-cyclohexylethyldimethylchlorosilane, 2-phenylethyldimethylchlorosilane, 3-phenylpropyldimethylchlorosilane, 4-phenylbutyldimethylchlorosilane, 3-(4-methoxyphenyl)propyldimethylchlorosilane, 2-naphthylethyldimethylchlorosilane, 3-chloropropyldimethylchlorosilane, 3-bromopropyldimethylchlorosilane, 3-chlorobutyldimethylchlorosilane, 3-bromobutyldimethylchlorosilane, 4-chlorobutyldimethylchlorosilane, 4-bromobutyldimethylchlorosilane, 3-acetoxypropyldimethylchlorosilane, 4-acetoxybutyldimethylchlorosilane, 3-acryloxypropyldimethylchlorosilane, 3-methacryloxypropyldimethylchlorosilane, 3-oxobutyldimethylchlorosilane, 3-oxopentyldimethylchlorosilane, 4-oxopentyldimethylchlorosilane, 4-oxapentyldimethylchlorosilane, 4-oxahexyldimethylchlorosilane, 5-oxahexyldimethylchlorosilane, 2-(trimethylsilyl)ethyldimethylchlorosilane, 2-(triethylsilyl)ethyldimethylchlorosilane, 2-(chlorodimethylsilyl)ethyldimethylchlorosilane, 1,2-bis(dimethylchlorosilyl)ethane, 2-(trichlorosilyl)ethyldimethylchlorosilane, 3-(trimethylsilyl)propyldimethylchlorosilane, 3-(triethylsilyl)propyldimethylchlorosilane, 3-(chlorodimethylsilyl)propyldimethylchlorosilane, 1,3-bis(dimethylchlorosilyl)propane, and 3-(trichlorosilyl)propyldimethylchlorosilane.

EXAMPLES

Examples and Comparative Examples are given below by way of illustration, but not by way of limitation.

Example 1

A flask equipped with a stirrer, reflux condenser, dropping funnel and thermometer was charged with 22.2 g (0.15 mol) of 4-allylanisole, 0.0013 g (0.00000375 mol as iridium metal) of di-μ-chlorobis(μ-1,5-cyclooctadiene)diiridium, 0.081 g (0.00075 mol) of 1,5-cyclooctadiene, and 0.11 g (0.0015 mol) of allyl chloride. While the internal temperature was adjusted at 50-60° C., 14.2 g (0.15 mol) of dimethylchiorosilane was added dropwise over 1 hour. During dropwise addition of dimethylchlorosilane, 0.0039 g of di-μ-chlorobis(μ-1,5-cyclooctadiene)diiridium and 0.24 g of 1,5-cyclooctadiene were added in two divided portions. At the end of dropwise addition, the reaction mixture was aged at the temperature for 0.5 hour, completing the reaction.

The reaction solution was analyzed by gas chromatography, finding a reaction rate of 94.1%. Formation of 5.0% of 4-allylanisole isomer was confirmed.

Comparative Example 1

Reaction was carried out as in Example 1 aside from omitting allyl chloride. Exotherm disappeared approximately when 50% of the predetermined amount was added dropwise. On analysis by gas chromatography, the final reaction rate was as low as 49.2%. Formation of 19.1% of 4-allylanisole isomer was confirmed.

Comparative Example 2

A flask equipped with a stirrer, reflux condenser, dropping funnel and thermometer was charged with 44.5 g (0.3 mol) of 4-allylanisole, 0.098 g (0.000015 mol as platinum metal) of 3 wt % toluene solution of platinum/1,3-divinyl-1,1,3,3-tetramethyldisiloxane complex. While the internal temperature was adjusted at 50-60° C., 28.4 g (0.3 mol) of dimethylchlorosilane was added dropwise over 1 hour. At the end of dropwise addition, the reaction mixture was aged at the temperature for 0.5 hour, completing the reaction.

The reaction solution was analyzed by gas chromatography, finding a reaction rate of 88.0%. Formation of 12.0% of 4-allylanisole isomer was confirmed.

Example 2

A flask equipped with a stirrer, reflux condenser, dropping funnel and thermometer was charged with 19.8 g (0.15 mol) of 4-phenyl-1-butene, 0.010 g (0.000030 mol as iridium metal) of di-μ-chlorobis(μ-1,5-cyclooctadiene)diiridium, 0.65 g (0.0060 mol) of 1,5-cyclooctadiene, and 0.11 g (0.0015 mol) of allyl chloride. While the internal temperature was adjusted at 50-60° C., 14.2 g (0.15 mol) of dimethylchlorosilane was added dropwise over 1 hour. At the end of dropwise addition, the reaction mixture was aged at the temperature for 0.5 hour, completing the reaction.

The reaction solution was analyzed by gas chromatography, finding a reaction rate of 91.0%. Formation of 3.0% of 4-phenyl-1-butene isomer was confirmed.

Comparative Example 3

Reaction was carried out as in Example 2 aside from omitting allyl chloride. Exotherm disappeared approximately when 75% of the predetermined amount was added dropwise. On analysis by gas chromatography, the final reaction rate was as low as 71.4%. Formation of 9.9% of 4-phenyl-1-butene isomer was confirmed.

Comparative Example 4

A flask equipped with a stirrer, reflux condenser, dropping funnel and thermometer was charged with 19.8 g (0.15 mol) of 4-phenyl-1-butene, 0.049 g (0.0000075 mol as platinum metal) of 3 wt % toluene solution of platinum/1,3-divinyl-1,1,3,3-tetramethyldisiloxane complex. While the internal temperature was adjusted at 50-60° C., 12.8 g (0.15 mol) of dimethylchlorosilane was added dropwise over 1 hour. At the end of dropwise addition, the reaction mixture was aged at the temperature for 0.5 hour, completing the reaction.

The reaction solution was analyzed by gas chromatography, finding a reaction rate of 90.6%. Formation of 9.3% of 4-phenyl-1-butene isomer was confirmed.

Example 3

A flask equipped with a stirrer, reflux condenser, dropping funnel and thermometer 10 was charged with 37.9 g (0.15 mol) of 1-octadecene, 0.010 g (0.000030 mol as iridium metal) of di-µ-chlorobis(µ-1,5-cyclooctadiene)diiridium, 0.65 g (0.0060 mol) of 1,5-cyclooctadiene, and 0.11 g (0.0015 mol) of allyl chloride. While the internal temperature was adjusted at 50-60° C., 14.2 g (0.15 mol) of dimethylchlorosilane was added dropwise over 1 hour. Exotherm disappeared before 100% of the predetermined amount was added dropwise. On analysis by gas chromatography, the final reaction rate was 73.4%.

Comparative Example 5

Reaction was carried out as in Example 3 aside from omitting allyl chloride. Exotherm disappeared approximately when 50% of the predetermined amount was added dropwise. Analysis by gas chromatography showed a final reaction rate of 44.4%, which was lower than in Example 3.

Example 4

A flask equipped with a stirrer, reflux condenser, dropping funnel and thermometer was charged with 120.7 g (1.0 mol) of chlorodimethylvinylsilane, 0.067 g (0.00020 mol as iridium metal) of di-µ-chlorobis(µ-1,5-cyclooctadiene) diiridium, 4.3 g (0.040 mol) of 1,5-cyclooctadiene, 0.77 g (0.010 mol) of allyl chloride, and 200 ml of tetralin. While the internal temperature was adjusted at 50-60° C., 95.6 g (1.0 mol) of dimethylchlorosilane was added dropwise over 2 hours. At the end of dropwise addition, the reaction mixture was aged at the temperature for 0.5 hour, completing the reaction.

The reaction solution was analyzed by gas chromatography, finding a reaction rate of 99.2%. There was detected neither isomer nor addition isomer of chlorodimethylvinylsilane.

Example 5

Reaction was carried out as in Example 4 aside from using 1.2 g (0.010 mol) of allyl bromide instead of allyl chloride. The reaction solution was analyzed by gas chromatography, finding a reaction rate of 99.5%. There was detected neither isomer nor addition isomer of chlorodimethylvinylsilane.

Comparative Example 6

Reaction was carried out as in Example 4 aside from omitting allyl chloride. Exotherm disappeared approximately when 75% of the predetermined amount was added dropwise. Analysis by gas chromatography showed a final reaction rate of 68.3%, which was lower than in Example 4.

Comparative Example 7

A flask equipped with a stirrer, reflux condenser, dropping funnel and thermometer was charged with 30.2 g (0.25 mol) of chlorodimethylvinylsilane, 0.033 g (0.000005 mol as platinum metal) of 3 wt % toluene solution of platinum/1,3-divinyl-1,1,3,3-tetramethyldisiloxane complex. While the internal temperature was adjusted at 50-60° C., 23.7 g (0.25 mol) of dimethylchlorosilane was added dropwise over 4 hours. At the end of dropwise addition, the reaction mixture was aged at the temperature for 0.5 hour, completing the reaction.

The reaction solution was analyzed by gas chromatography, finding a reaction rate of 95.6%. No isomer of chlorodimethylvinylsilane was detected whereas 3.1% of addition isomer formed.

Japanese Patent Application No. 2021-075964 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for preparing a halosilane compound comprising the step of effecting hydrosilylation reaction of a vinyl compound having the general formula (1):

$$R^1CH=CH_2 \tag{1}$$

wherein $R^1$ is a $C_1$-$C_{20}$ substituted or unsubstituted monovalent hydrocarbon group which may contain oxygen or silicon, or a silyl group having the general formula (2):

$$-SiR^2R^3R^4 \tag{2}$$

wherein $R^2$ to $R^4$ are each independently halogen, a $C_1$-$C_{10}$ unsubstituted monovalent hydrocarbon group or a $C_1$-$C_{10}$ unsubstituted alkoxy group, with a halogenodiorganosilane compound having the general formula (3):

$$HSiR^5_2X \tag{3}$$

wherein $R^5$ is each independently a $C_1$-$C_{20}$ unsubstituted monovalent hydrocarbon group and X is halogen, in the presence of an iridium catalyst to produce a halosilane compound having the general formula (4):

$$R^1CH_2CH_2SiR^5_2X \tag{4}$$

wherein $R^1$, $R^5$, and X are as defined above, the hydrosilylation reaction being effected in the co-presence of an internal olefin compound having the general formula (5):

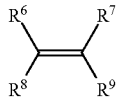
(5)

wherein $R^6$ and $R^7$ are each independently a $C_1$-$C_{10}$ unsubstituted monovalent hydrocarbon group, $R^6$ and $R^7$ may bond together to form a ring with the carbon atoms to which they are attached, $R^8$ and $R^9$ are each independently hydrogen or a $C_1$-$C_{10}$ unsubstituted monovalent hydrocarbon group and a halogenated allyl compound having the general formula (6):

$$YCH_2CH=CH_2 \qquad (6)$$

wherein Y is halogen, exclusive of the vinyl compound having formula (1).

2. The method of claim 1 wherein the halogenated allyl compound is allyl chloride or allyl bromide.

3. The method of claim 1 wherein in the reaction system, the halogenated allyl compound is present in an amount of 0.00001 to 1 mole per mole of the vinyl compound.

4. The method of claim 1 wherein the iridium catalyst is an iridium complex having the general formula (7):

$$[Ir(R)Z]_2 \qquad (7)$$

wherein R is a cyclic diene compound having the general formula (8):

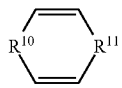
(8)

wherein $R^{10}$ and $R^{11}$ are each independently a $C_1$-$C_5$ divalent hydrocarbon group, $R^{10}$ and $R^{11}$ may bond together to form a ring with the carbon atoms to which they are attached, and Z is halogen.

5. The method of claim 1 wherein the internal olefin compound is a cyclic olefin compound.

6. The method of claim 2 wherein in the reaction system, the halogenated allyl compound is present in an amount of 0.00001 to 1 mole per mole of the vinyl compound.

7. The method of claim 2 wherein the iridium catalyst is an iridium complex having the general formula (7):

$$[Ir(R)Z]_2 \qquad (7)$$

wherein R is a cyclic diene compound having the general formula (8):

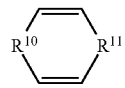
(8)

wherein $R^{10}$ and $R^{11}$ are each independently a $C_1$-$C_5$ divalent hydrocarbon group, $R^{10}$ and $R^{11}$ may bond together to form a ring with the carbon atoms to which they are attached, and Z is halogen.

8. The method of claim 3 wherein the iridium catalyst is an iridium complex having the general formula (7):

$$[Ir(R)Z]_2 \qquad (7)$$

wherein R is a cyclic diene compound having the general formula (8):

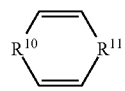
(8)

wherein $R^{10}$ and $R^{11}$ are each independently a $C_1$-$C_5$ divalent hydrocarbon group, $R^{10}$ and $R^{11}$ may bond together to form a ring with the carbon atoms to which they are attached, and Z is halogen.

9. The method of claim 2 wherein the internal olefin compound is a cyclic olefin compound.

10. The method of claim 3 wherein the internal olefin compound is a cyclic olefin compound.

11. The method of claim 4 wherein the internal olefin compound is a cyclic olefin compound.

* * * * *